(12) United States Patent
Shirai et al.

(10) Patent No.: US 6,304,286 B1
(45) Date of Patent: *Oct. 16, 2001

(54) STEREOSCOPIC DISPLAY APPARATUS FOR GENERATING IMAGES IN ACCORDANCE WITH AN OBSERVER'S VIEWING POSITION

(75) Inventors: Kazuyuki Shirai; Takayuki Yoshioka; Noriyasu Kato; Tomohiko Matsushita, all of Tokyo (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/658,106

(22) Filed: Jun. 4, 1996

(30) Foreign Application Priority Data

Jun. 9, 1995 (JP) .................................................. 7-168018
Nov. 13, 1995 (JP) .................................................. 7-318555

(51) Int. Cl.[7] .................................................. H04N 7/18
(52) U.S. Cl. .................................. 348/51; 348/52; 348/42; 348/43
(58) Field of Search .................................. 348/43, 44, 47, 348/51, 48, 53, 55, 54, 58, 59

(56) References Cited

U.S. PATENT DOCUMENTS

| | | | | |
|---|---|---|---|---|
| 4,959,641 | * | 9/1990 | Bass | 348/51 |
| 5,311,220 | * | 5/1994 | Eichenlaub | 348/55 |
| 5,349,379 | * | 9/1994 | Eichenlaub | 348/59 |
| 5,495,576 | * | 2/1996 | Ritchey | 395/125 |
| 5,502,481 | * | 3/1996 | Dentinger et al. | 348/51 |
| 5,537,144 | * | 7/1996 | Faris | 348/58 |
| 5,541,641 | * | 7/1996 | Shimada | 348/58 |
| 5,552,840 | * | 9/1996 | Ishii et al. | 348/58 |
| 5,644,427 | * | 7/1997 | Omori et al. | 348/51 |
| 5,703,717 | * | 12/1997 | Ezra et al. | 348/54 |
| 5,771,066 | * | 6/1998 | Barnea | 348/54 |
| 5,818,399 | * | 10/1998 | Omori et al. | 348/51 |
| 5,966,167 | * | 10/1999 | Nose et al. | 348/54 |
| 6,014,164 | * | 1/2000 | Woodgate | 345/51 |
| 6,040,807 | * | 3/2000 | Hamagishi | 348/51 |

FOREIGN PATENT DOCUMENTS

| | | |
|---|---|---|
| 61-23116 | 1/1986 | (JP) . |
| 6-148763 | 5/1994 | (JP) . |
| 6-34528 | 5/1994 | (JP) . |
| 6-269025 | 9/1994 | (JP) . |
| 4-344795 | 12/1994 | (JP) . |

* cited by examiner

Primary Examiner—Andy Rao
(74) Attorney, Agent, or Firm—Morgan, Lewis & Bockius LLP

(57) ABSTRACT

A stereoscopic display apparatus such that when an viewing point position of an observer is moved, a stereoscopic image similar to that observed at the moved position is obtained. A plurality of images according to a plurality of viewing point positions are generated from right/left image generating apparatuses. One of the plurality of images selected by a switching device is supplied to an image display apparatus. An observer observes a stereoscopic image by a liquid crystal driving apparatus, liquid crystal polarizing plates, and polarizing spectacles. Infrared rays from infrared light emitting devices are partially obstructed by the observer and are received by infrared photosensitive devices. A position detection processing circuit judges the image according to an viewing point position of the observer from detection signals, thereby switching the switching device to the right/left image generating apparatuses.

23 Claims, 7 Drawing Sheets

STEREOSCOPIC DISPLAY APPARATUS FOR GENERATING IMAGES IN ACCORDANCE WITH AN OBSERVER'S VIEWING POSITION

BACKGROUND OF THE INVENTION

1. Field of the Invention

The invention relates to a stereoscopic display apparatus for supplying right and left two images with a difference between visual angles of both eyes to stereoscopic image display means, thereby stereoscopically displaying the images by the stereoscopic image display means.

2. Description of Background Information

A system for stereoscopically displaying an image can be mainly classified into two kinds of a multi-eye type stereoscopic video system and a double-eye type stereoscopic video system.

The multi-eye type stereoscopic video system is disclosed in, for example, Japanese Patent Kokai (laying open) Nos. 6-269025, 4-344795, and 6-148763.

FIG. 1 shows an example of a stereoscopic display apparatus using this multi-eye type stereoscopic video system.

As shown in FIG. 1, a camera group 2 comprising four cameras 2a to 2d is arranged so that a distance between the adjacent cameras is generally equal to an interval between human eyes, and the camera group 2 shoots a dice 1 as an object. Video signals of the dice 1 taken by the cameras 2a to 2d are regularly supplied to a video image display apparatus 3 (for example, liquid crystal display apparatus) in accordance with the order of arrangement of the cameras, respectively. A solid video image of the dice 1 is observed from the front side of a lenticular lens 4.

For example, video images seen by an observer 5 from a front position 5a are video images taken by the cameras 2a and 2b and the dice 1 is observed as a stereoscopic image like an image 6a. The video images seen by the observer 5 who has moved to a position 5b on the left-hand side are video images taken by the cameras 2a and 2c and the dice 1 is observed as a stereoscopic image like an image 6b. Similarly, when the observer 5 moves to a position 5c on the right side, a stereoscopic image 6c of the dice 1 which is obtained from the cameras 2b and 2d is observed.

As mentioned above, in the case of the multi-eye type image display apparatus, when the observer 5 moves along the video image display apparatus in front of the apparatus, the observer sees the video images taken at a position that is equivalent to the position where he has moved. The observer, consequently, can see the video image as if he observed a real image of the object.

The stereoscopic video system has been disclosed in, for example, Japanese Patent Kokoku No. 6-34528 and Japanese Patent Kokai No. 61-23116. FIG. 2 shows a stereoscopic display apparatus using the double-eye type stereoscopic video system. Video signals obtained by shooting the dice 1 by the left and right two cameras 2a and 2b can be observed by using the video image display apparatus 3.

According to the stereoscopic display apparatus of the multi-eye type, although the object can be displayed on a screen as a natural form, the apparatus increases in size and becomes complicated and the range of its uses is limited in spite that there is an effective use value in such fields as the product development and education using a stereoscopic image.

According to the double-eye type, as shown in FIG. 2, since the video signals obtained by the two cameras 2a and 2b arranged for the left and right eyes are merely observed by two eyes, although the dice 1 can be observed as a solid video image, even if the observer 5 moves to the left side 5b, front 5a, and right side 5c in front of the video image display apparatus 3, only the video image 6a observed at the (front) position 5a is always obtained as a video image that is derived from the video image display apparatus 3. More particularly, the video images 6b and 6c which are obtained by the multi-eye type as shown in FIG. 1 cannot be obtained. As mentioned above, according to the double-eye type, although the object can be observed as a stereoscopic image, it is limited to a range of the stereoscopic video images obtained by shooting the object by two cameras. A video image corresponding to the movement of the viewing point position in association with the motion of the face of the observer or the movement of the observer as in the case of the multi-eye type cannot be obtained.

Therefore, although it is sufficient to use the double-eye type image display apparatus for images if it is targeted to merely stereoscopically observe the object as in the case of a scenery, a flower garden, or the like, a desired target cannot be accomplished with the double-eye type image display apparatus as in the case of an application such that an automobile is examined as a solid structure that is seen from many positions of different viewing angles, and the like situations.

OBJECTS AND SUMMARY OF THE INVENTION

It is, therefore, an object of the invention to provide a stereoscopic display apparatus in which when a position of an viewing point of an observer moves, a stereoscopic image similar to that observed at the moved position can be derived.

To accomplish the above problems, according to the invention, there is provided a stereoscopic display apparatus for supplying right and left two images having a difference between viewing angles of both eyes, to stereoscopic image display means, thereby stereoscopically displaying the images by the stereoscopic image display means, comprising: image generating means for generating a plurality of images according to a plurality of viewing point positions for the stereoscopic image display means; position detecting means for detecting the position of the viewing point of the observer who observes the images which are stereoscopically displayed; and selecting means for selecting images corresponding to the viewing point position detected by the position detecting means from the image generating means and for supplying them to the stereoscopic image display means.

Among the above-described means, the viewing point position of the observer is detected by the position detecting means and the images corresponding to the detected viewing point position are selected by the selecting means from the plurality of images corresponding to the plurality of viewing point positions which are generated from the image generating means and are supplied to the stereoscopic image display means, thereby stereoscopically displaying the image.

Even if the viewing point position of the observer is moved, therefore, the position detecting means detects the viewing point position and the images according to the viewing point position are selected and stereoscopically displayed.

DETAILED DESCRIPTION OF THE EMBODIMENTS

Figure 1:
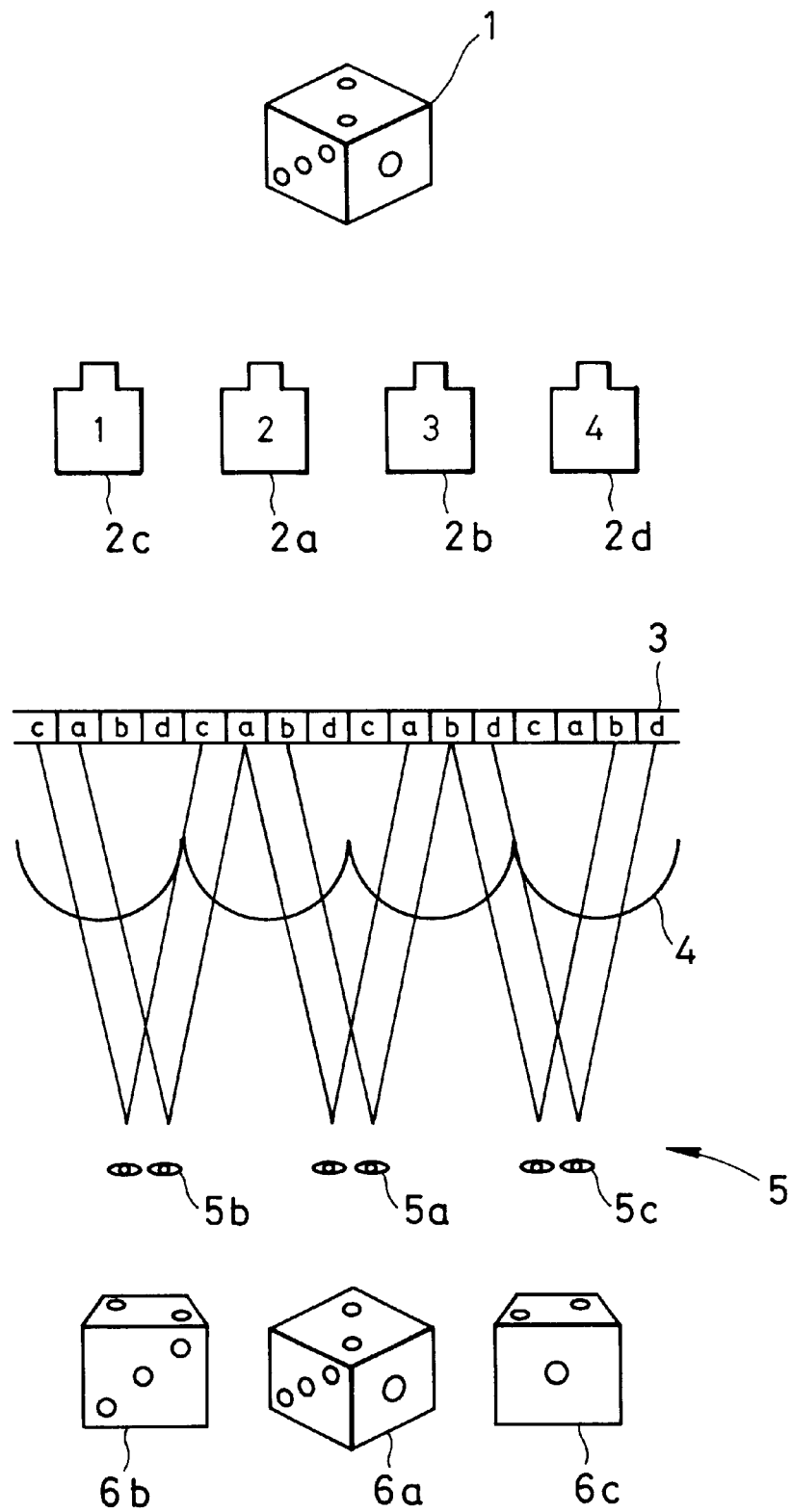
FIG. 1 is a diagram showing a conventional multi-eye type stereoscopic video image apparatus.
Figure 2:
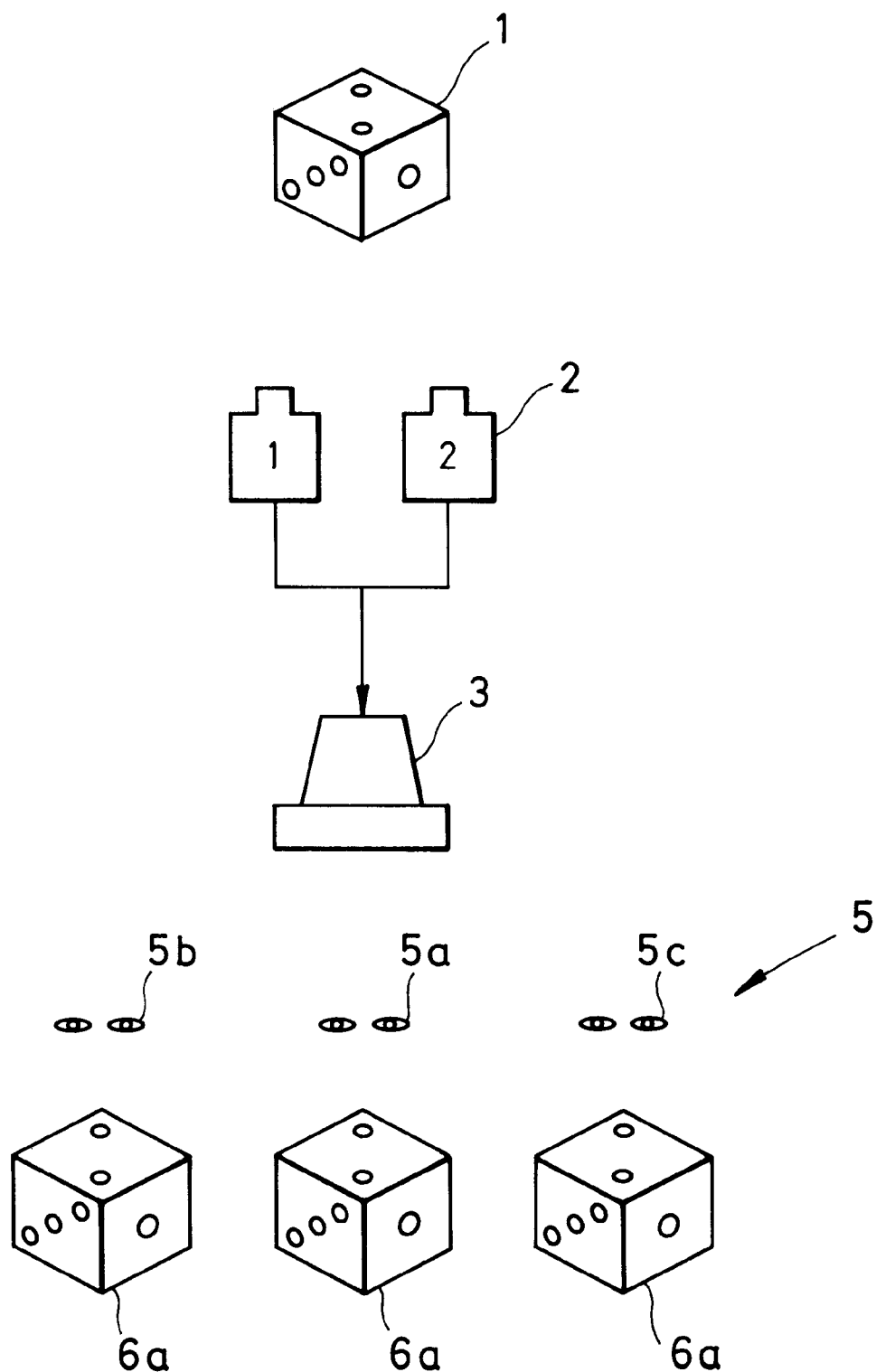
FIG. 2 is a diagram showing a conventional double-eye type stereoscopic video image apparatus.
Figure 3:
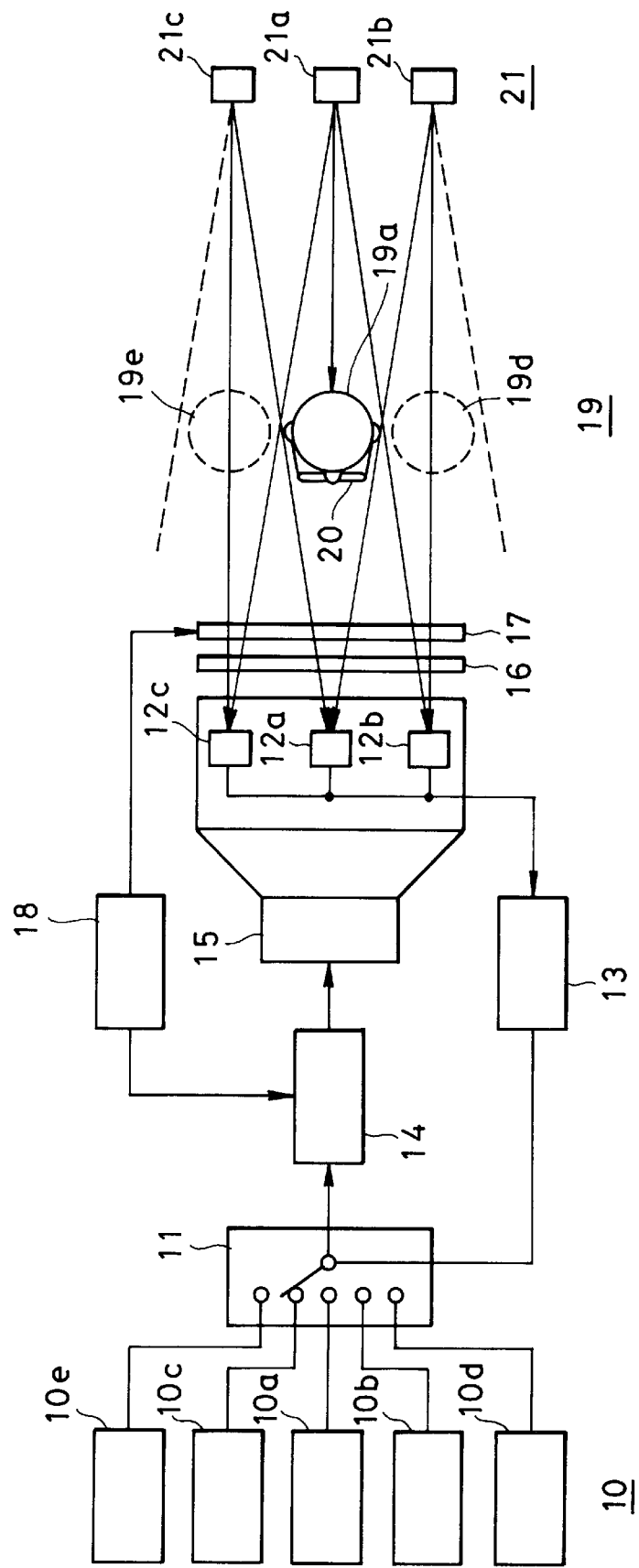
FIG. 3 is a diagram showing an embodiment of a stereoscopic display apparatus according to the invention.
Figure 4:
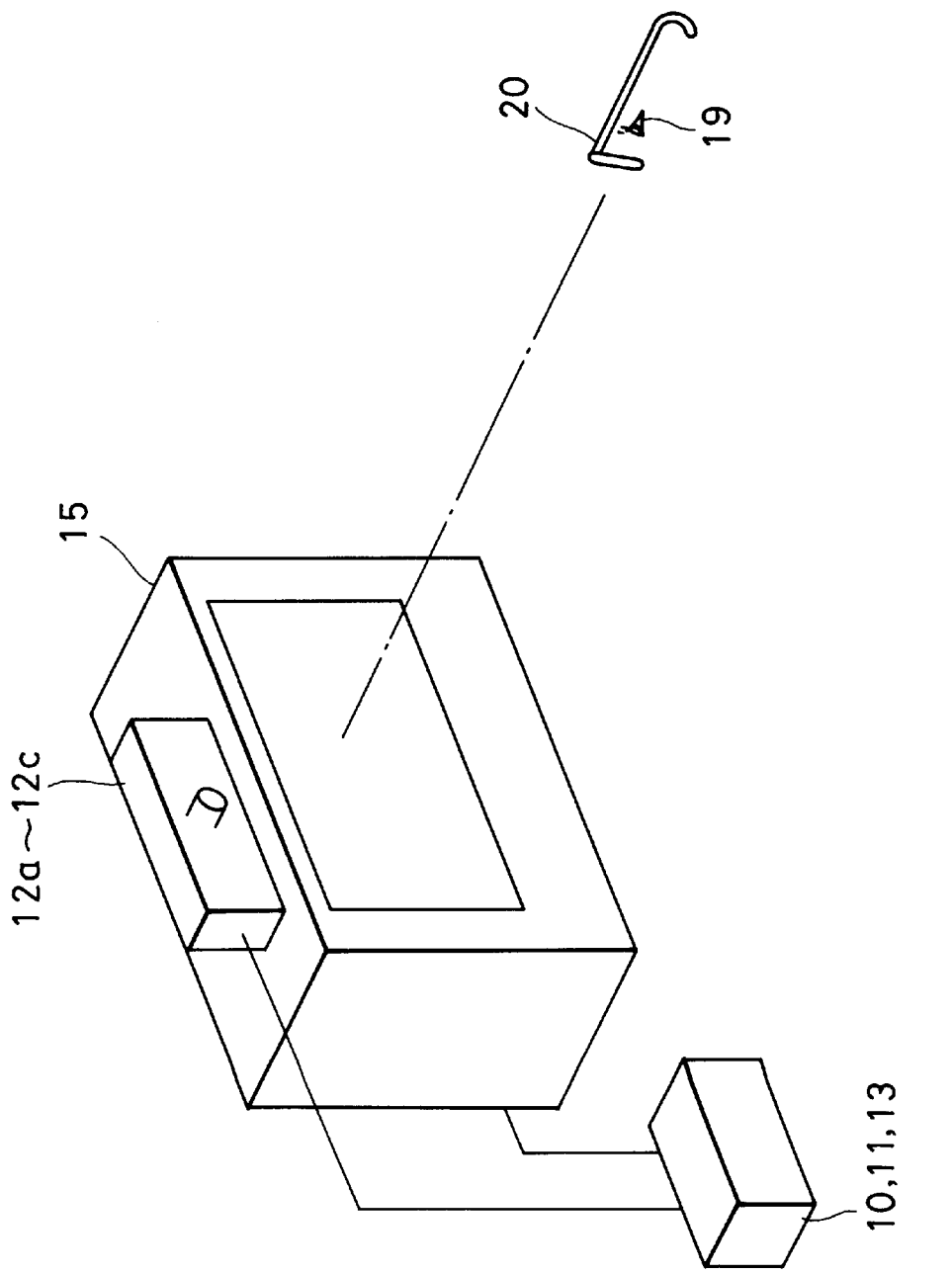
FIG. 4 is a diagram showing an outline of a whole construction of the stereoscopic display apparatus according to the invention.

An embodiment in which the invention is applied to the double-eye type will now be described hereinafter with reference to the drawings. In FIGS. 3 and 4, a right/left image generating apparatus 10 comprising apparatuses 10a to 10e alternately generates right and left video signals every field. The video signals from the right/left image generating apparatuses 10a to 10e are received at a switching device 11. One of the video signals is supplied to an image display apparatus 15 including a CRT through a video signal processing apparatus 14. A liquid crystal polarizing plate constructed by a linear polarizing plate 16 and a liquid crystal plate 17 is arranged in front of the image display apparatus 15. The liquid crystal plate 17 alternates rotatory polarizations whose polarizing axes are equal to 0° and 90° every field of the video signal from the right/left image generating apparatuses 10a to 10e, that is, every one of left and right video signals, by means of a liquid crystal driving apparatus 18. The polarizing axis of the polarizing plane of the liquid crystal polarizing plate, therefore, changes at 90° synchronously with the right and left images.

Polarizing spectacles 20 are worn by an observer 19. Linear polarizing plates in which the polarizing axes of the polarizing planes have a difference of 90° are placed at the right and left eye positions of the polarizing spectacles 20. A plurality of infrared light emitting devices 21a, 21b, and 21c are arranged behind the observer 19 along the moving direction (direction that is parallel with the CRT of the image display apparatus 15) of the observer 19. Each of the light emitting devices 21a, 21b, and 21c emits the light at a predetermined light emission angle as shown in FIG. 3.

A plurality of infrared photosensitive devices 12a, 12b, and 12c each having a predetermined light reception angle are arranged in front of the observer 19, respectively. A detection signal that is detected from each photosensitive device is supplied to a position detection processing circuit 13. By synthesizing the detection signals, the position detection processing circuit 13 generates a switching signal to the switching device 11. Since the infrared photosensitive devices 12a to 12c are generally put on the image display apparatus 15 as shown in FIG. 4, the infrared light emitting devices 21a to 21c are arranged on the same horizontal plane as that of the infrared photosensitive devices.

Figure 5:
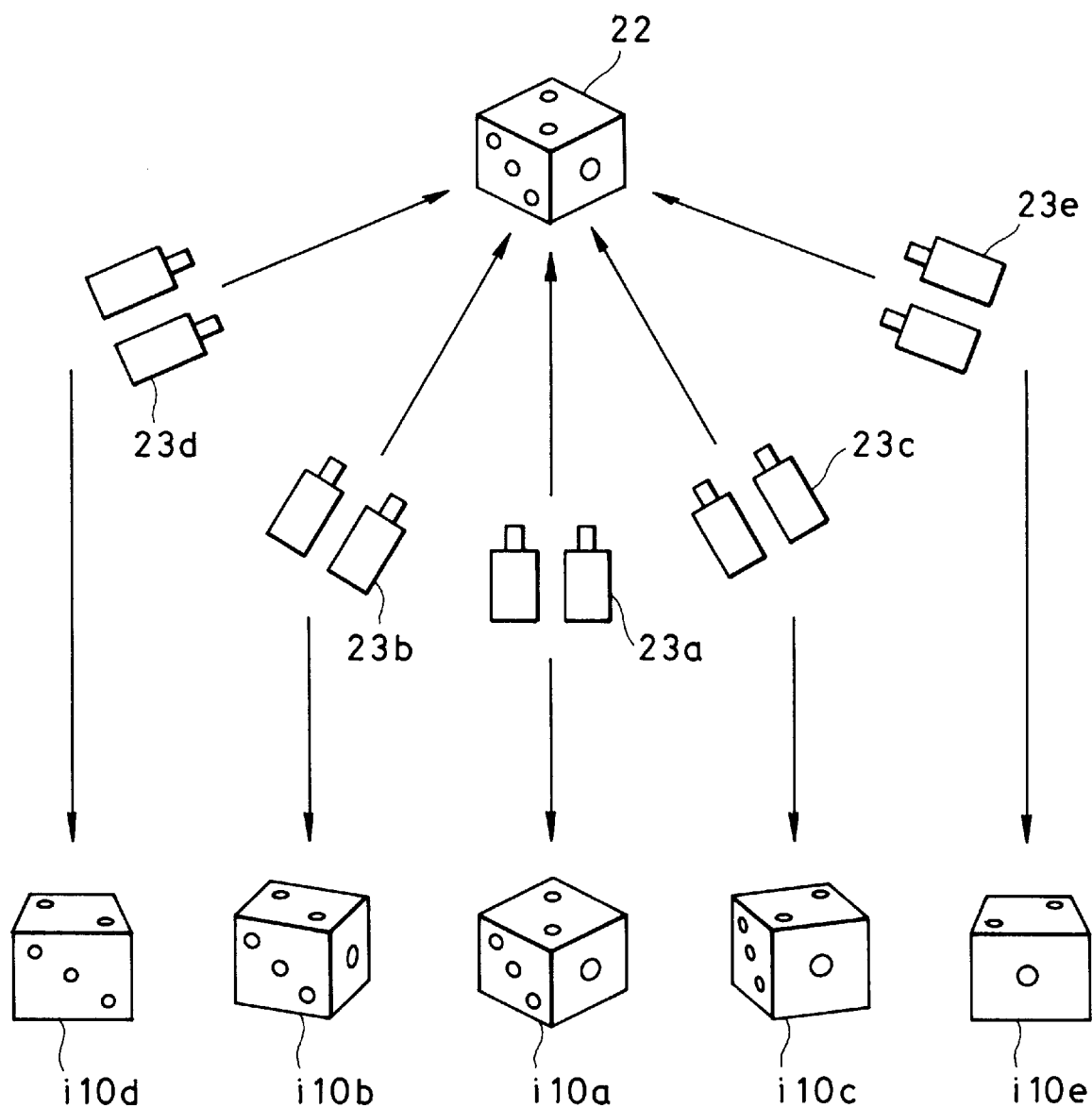
FIG. 5 is a diagram for explaining the operation according to the invention.

The solid video signal which is generated from the right/left image generating apparatus 10 will now be described with reference to FIG. 5. Five pairs of cameras 23a to 23e each constituted by two adjacent cameras are arranged around one object (dice) 22. The "adjacent cameras" denote the two cameras arranged in a manner such that a distance between the two cameras is generally equal to an interval between the human eyes. The shot images, therefore, become the right and left two images having a difference between the visual angles of both eyes. First, the images obtained by shooting the dice 22 as an object by the cameras 23a arranged at the front position are the image shown at i10a. The images i10a becomes the video signal which is generated from the right/left image generating apparatus 10a. Similarly, it is now assumed that the images obtained by shooting the dice 1 by the cameras 23d arranged at the position on the left side of the dice 1 are the image i10d and that the images obtained by shooting the dice 1 by the cameras 23e arranged on the right side of the dice 1 are the image i10e. It is also assumed that the images obtained by shooting the dice 1 by the camera 23b arranged at an intermediate position between the cameras 23a and 23d are the image i10b and that the images obtained by shooting the dice 1 by the camera 23c arranged at the intermediate position between the cameras 23a and 23e are the image i10c. As in the case of the image i10a, the images i10b to i10e become the video signals which are generated from the right/left image generating apparatuses 10b to 10e. From each of the right/left image generating apparatuses, the right and left images are alternately produced as video signals every field as mentioned above.

The operations will now be described with reference to FIGS. 3 and 4.

From the right/left image generating apparatus 10, the stereoscopic video signals by viewing the object from a plurality of positions are alternately generated every field. The output from one right/left image generating apparatus, which is selected by the switching device 11, is subjected to a predetermined signal process by the video signal processing apparatus 14, and is sent to the image display apparatus 15. The image display apparatus 15 alternately displays the right and left images every field. A vertical sync signal included in the output video signals from the right/left image generating apparatus is transmitted to the liquid crystal driving apparatus 18. By driving the liquid crystal plate 17 every field, the polarizing axis of the polarizing plane of the liquid crystal polarizing plate changes at 0° and 90° every field. In the polarizing spectacles 20 worn by the observer 19, the polarizing plates of the right and left eye positions have the polarizing axes with a difference of 90° and coincide with the polarizing axes of the liquid crystal polarizing plates. Therefore, when the image display apparatus 15, displays the image for the right (left) eye, the linear polarizing plate of the right (left) eye portion of the polarizing spectacles 20 transmits the light and the linear polarizing plate of the left (right) eye portion is shielded against the light. The video signals for the right and left eyes, therefore, arrive at the right and left eyes of the observer 19, respectively, so that the observer can visually perceive a stereoscopic image.

When the observer 19 wearing the polarizing spectacles 20 is right in front of the image display apparatus 15 (19a), the infrared rays from the infrared light emitting devices 21c and 21a reach the infrared photosensitive device 12c, while the infrared rays from the infrared light emitting devices 21a and 21b reach the infrared photosensitive device 12b. On the other hand, although the infrared rays from the infrared light emitting devices 21b and 21c reach the infrared photosensitive device 12a, the infrared rays from the infrared light emitting device 21a are shielded by a part of the body of the observer 19 and don't reach the photosensitive device 12a.

Similarly, when the observer 19 moves and the viewing point is located at a position 19e, although the infrared rays from the infrared light emitting device 21a reach the infrared photosensitive device 12c, the infrared rays from the light emitting device 21c is obstructed by the observer 19 and don't reach it. The infrared rays from the light emitting devices 21c and 21a reach the photosensitive device 12a. The infrared rays from the light emitting devices 21a and 21b reach the photosensitive device 12b.

When the viewing point is located at a position 19d, although the infrared rays from the infrared light emitting device 21a reach the infrared photosensitive device 12b, the infrared rays from the light emitting device 21b don't reach it.

As mentioned above, the detection signals which are obtained by receiving the lights by the infrared photosensitive devices 12a to 12c differ depending on the viewing point position of the observer 19. The position detection processing circuit 13, therefore, receives the detection signals from the infrared photosensitive devices 12a to 12c, synthesizes the detection results, and detects the viewing point position of the observer 19, thereby generating a switching signal to the switching device 11.

Namely, when the viewing point of the observer 19 is located at the position 19a, the position detection processing circuit 13 controls the switching device 11 so as to select and generate the solid video signal from the right/left image generating apparatus 10a. When the viewing point is moved to the positions 19d and 19e, the switching device 11 selects and generates the video images from the right/left image generating apparatuses 10d and 10e. When the viewing point is further moved to the intermediate position between the positions 19a and 19e or between the positions 19a and 19d, the switching device 11 selects and generates the solid video images from the image generating apparatuses 10c and 10b, respectively.

It will be readily understood that the number of infrared light emitting devices and the number of infrared photosensitive devices can also be a plural value other than 3.

It is also possible to construct the system in a manner such that either one or both of the infrared light emitting device and the infrared photosensitive device are arranged as one device and is periodically moved in almost the same direction as the moving position direction of the observer 19, thereby similarly executing operations similar to those of the plurality of light emitting devices 21a to 21c and photosensitive devices 12a to 12c in the embodiment shown in FIG. 3.

In the embodiment of FIG. 3, although the liquid crystal polarizing plate has been arranged in front of the image display apparatus 15 and the polarizing spectacles 20 have been attached to the observer 19, further, it is also possible to arrange the linear polarizing plate in front of the image display apparatus 15 and to use the liquid crystal polarizing spectacles in which liquid crystal polarizing plates each of which is constituted by a liquid crystal plate and a linear polarizing plate and which are driven synchronously with right and left images from the right/left image generating apparatuses are placed at the right and left eye positions. In this instance, the liquid crystal polarizing spectacles are driven synchronously with the right and left images in a manner such that the polarizing axis of the polarizing plane of one of the liquid crystal polarizing plates coincides with the polarizing axis of the linear polarizing plate and the polarizing axis of the polarizing plane of the other liquid crystal polarizing plate has a difference of 90° from the former polarizing axis.

It is also possible to use the CRT comprising three tubes of R, G, and B as a CRT of the image display apparatus 15, to generate the video signals from the right/left image generating apparatuses as RGB signals by the video signal processing apparatus 14, and to supply the RGB signals to the CRT of RGB, respectively.

Figure 6:
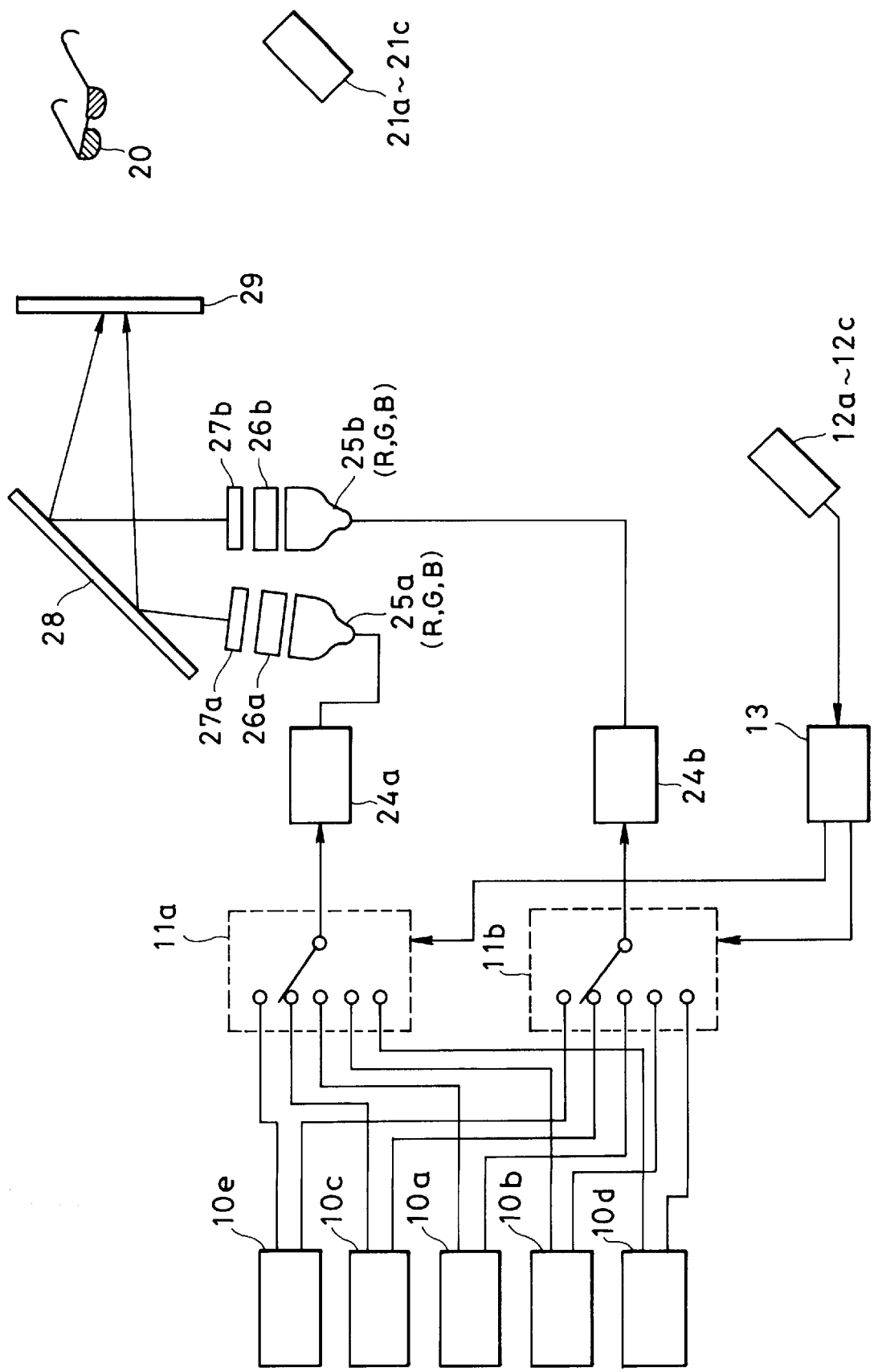
FIGS. 6 and 7 are diagrams showing another embodiment of a stereoscopic display apparatus according to the invention.

FIG. 6 shows another embodiment of the invention and is constructed so as to display the video signals respectively for the left and right eyes by projecting type display apparatuses, respectively. That is, the video signals for the left and right eyes are respectively simultaneously generated from the right/left image generating apparatuses 10a to 10e. The video signals for the left eye are supplied to a switching device 11a. The video signals for the right eye are sent to a switching device 11b. The left and right video signals selected by the switching devices 11a and 11b are supplied to signal processing circuits 24a and 24b, respectively, and are subjected to predetermined signal processes, so that RGB signals are generated. The left and right RGB signals are transmitted to the CRTs each comprising the three tubes of RGB and the corresponding light beams pass through projecting lenses 26a and 26b arranged in front of the CRTs and enter linear polarizing plates 27a and 27b whose polarizing planes perpendicularly cross each other at 90°. The left and right images emitted from the polarizing plates 27a and 27b are reflected by a reflecting mirror 28 and is projected onto a screen 29. The images projected to the screen 29 are seen through the spectacles including linear polarizing plates, whose polarizing planes perpendicularly cross at 90°, placed at the right and left eye positions, thereby visually observing the video signals for the right and left eyes as a stereoscopic image.

The apparatus has the infrared light emitting devices 21a to 21c, infrared photosensitive devices 12a to 12c, and position detection processing circuit 13 as in the embodiment of FIG. 3. By the operations similar to those mentioned above, the position of the observer 19 is detected, switching signals are generated from the position detection processing circuit 13 to the switching devices 11a and 11b, and each of the switching devices 11a and 11b selects one of the signals from the right/left image generating apparatuses 10a to 10e corresponding to the position of the observer and supplies to the signal processing circuits 24a and 24b.

In each of the above embodiments, the infrared photosensitive devices 12a to 12c have been arranged in the upper portion of the image display apparatus 15 and the infrared light emitting devices 21a to 21c have been arranged behind the observer 19. It is, however, also possible to construct the apparatus by using a pyroelectric type human body detecting sensor such that both of the photosensitive devices and the light emitting devices are provided on the image display apparatus side and the infrared rays from the infrared light emitting devices are reflected by the observer and the reflected signals are detected by the infrared photosensitive devices.

It is also possible to construct in a manner such that by means for attaching the infrared light emitting devices to the polarizing spectacles 20 or the liquid crystal polarizing spectacles or the like, the observer 19 himself possesses the infrared light emitting devices, thereby allowing the light emitting position from the infrared light emitting device to be moved in accordance with the movement of the observer.

Figure 7:
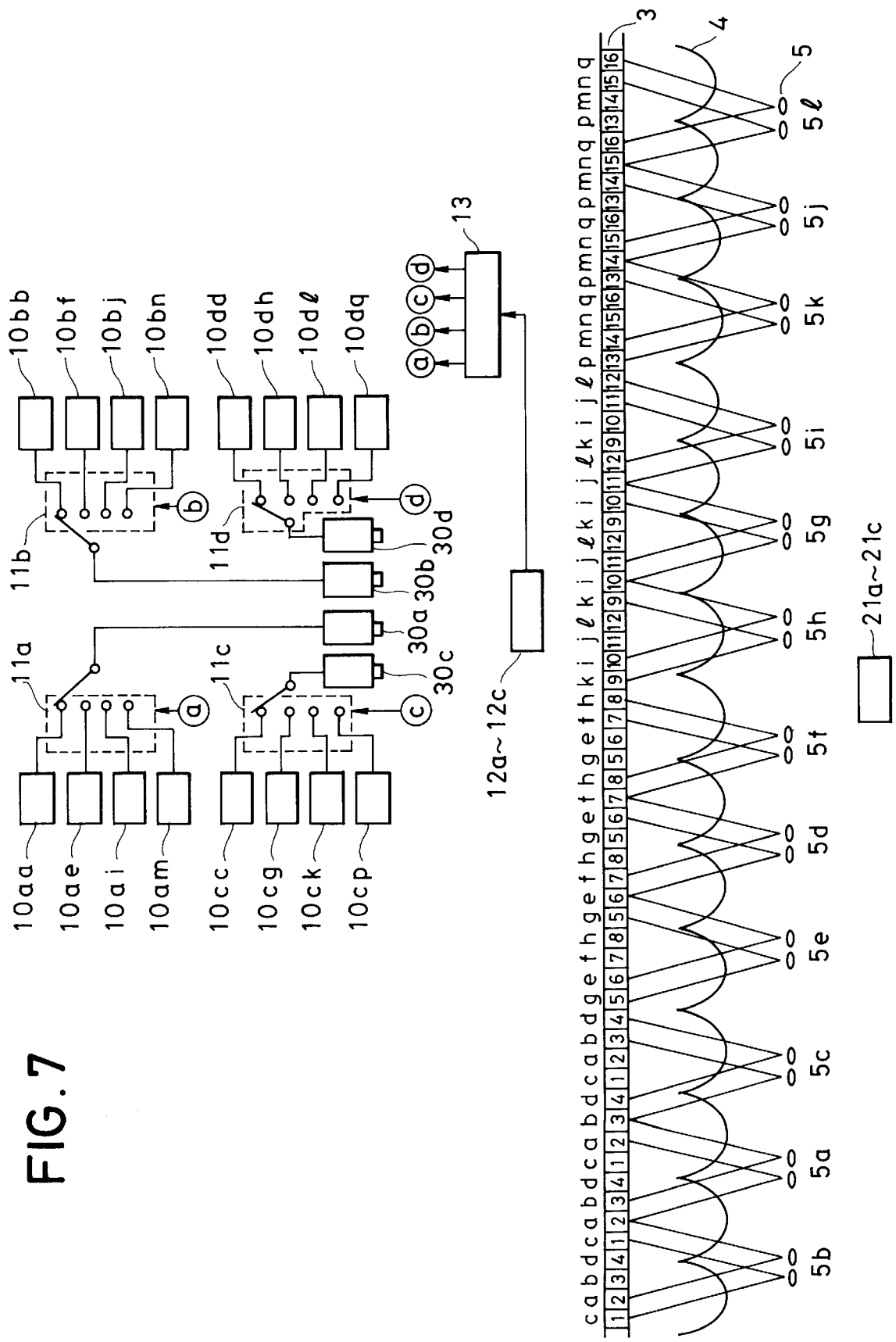

FIG. 7 shows an embodiment to which the invention is applied to the multi-eye type. Sixteen cameras (not shown) are arranged in a manner such that the distance between each adjacent two of the cameras is near to the interval between the human eyes and the cameras shoot the object respectively. The shot images are generated from image generating apparatuses 10aa to 10dq and are properly selected by switching devices 11a to 11d which are switched in an interlocking manner with each other and are simultaneously projected from four projecting apparatuses 30a to 30d, respectively. The projected images are regularly supplied to the video image display apparatus 3 (for example, liquid crystal display apparatus) in accordance with the arrangement order of the cameras. A solid video image of the object is observed from the front side of the lenticular lens 4.

In a manner similar to the foregoing embodiments, the infrared light emitting devices 21a to 21c, infrared photosensitive devices 12a to 12c, and position detection processing circuit 13 are provided. The switching devices 11a to 11d are switched and controlled by an output from the position detection processing circuit 13.

In the above construction, for example, when the observer 5 is located at positions 5a to 5c, the infrared light emitting devices 21a to 21c, infrared photosensitive devices 12a to 12c, and position detection processing circuit 13 detect those positions. The image generating apparatuses 10aa, 10bb, 10cc, and 10dd are selected by the switching devices 11a to 11d. When the observer 5 is located at the position 5a, the images from the projecting apparatuses 30a and 30b are observed. When the observer 5 is located at the positions 5b and 5c, the images from the projecting apparatuses 30c and 30a and the images from the projecting apparatuses 30b and 30d are observed, respectively.

When the observer 5 is located at positions 5d to 5f, the image generating apparatuses 10ae, 10bf, 10cg, and 10dh are selected by the switching devices 11a to 11d and the video signals therefrom are supplied to the projecting apparatuses 30a to 30d, respectively. When the observer 5 is located at positions 5d, 5e, and 5f, the images from the projecting apparatuses (30a and 30b), (30c and 30a), and (30b and 30d) are observed, respectively.

In a manner similar to the above, when the observer 5 is located at positions 5g to 5i and 5j to 5i, the image generating apparatuses (10ai, 10bj, 10ck, 10dq) and (10am, 10bn, 10cp, and 10dq) are selected, respectively. In the selected image generating apparatuses, desired images are observed in accordance with the positions (5g to 5i) and (5j to 5l), respectively.

Namely, the image generating apparatuses 10aa to 10dq generate a plurality of images according to the positions in a plurality of different predetermined ranges of the observer. Four images according to one predetermined range position corresponding to the position of the observer 5 are selected by the switching devices 11a to 11d and are simultaneously supplied to the projecting apparatuses 30a to 30d. The image according to the viewing point position at the positions in such one predetermined range of the observer 5 among the four images is observed by the video image display apparatus 3 and lenticular lens 4.

As mentioned above, according to the invention, in the stereoscopic display apparatus for supplying two right and left images having a difference between the visual angles of both eyes to the stereoscopic image display means, thereby stereoscopically displaying the image by the stereoscopic image display means, the apparatus is constructed by: the image generating means for generating a plurality of images according to a plurality of viewing point positions for the stereoscopic image display means; position detecting means for detecting the viewing point position of the observer who observes the image that was stereoscopically displayed; and selecting means for selecting the image according to the viewing point position detected by the position detecting means from the image generating means and supplying to the stereoscopic image display means. The construction, consequently, is not made complicated and, in a manner similar to the multi-eye type, when the viewing point position of the observer is moved, a stereoscopic image similar to that observed at the moved position can be obtained.

In the field of computer graphics using a polygon process or the like, it is often needed to reproduce images seen from angles of every viewing point positions. The invention is therefore particularly suited for the computer graphics.

What is claimed is:

1. A stereoscopic display apparatus for supplying right and left images to a stereoscopic image display, the right and left images having a difference between visual angles corresponding to eyes of an observer, comprising:

image generating means for generating a plurality of right and left images by a plurality of image pickup means corresponding to a plurality of viewing point positions;

position detecting means for detecting a viewing point position of an observer standing within a predetermined area that includes said plurality of viewing point positions to observe the stereoscopic image display, the position detecting means including:

stationary light emitting means for emitting light through the predetermined area in which the observer may move about among said plurality of viewing point positions to observe the stereoscopic image display; and photosensitive means, facing the light emitting means, for receiving light from said light emitting means, wherein a portion of the light is interrupted by the observer standing at a viewing point position within the predetermined area between the light emitting means and the photosensitive means; and switching means for first selecting a subset of the plurality of image pickup means corresponding to the viewing point position detected by said position detecting means from said image generating means and then supplying the right image and left image generated by the selected subset of the plurality of image pickup means to the stereoscopic image display.

2. The apparatus according to claim 1, wherein said right and left images are alternately generated every field from said image generating means, and said stereoscopic image display means comprises:

a CRT;

liquid crystal polarizing plates constituted by linear polarizing plates arranged in front of said CRT and liquid crystal plates which are driven synchronously with said right and left images; and polarizing spectacles in which linear polarizing plates whose polarizing axes of polarizing planes have a difference of 90° are placed at right and left eye positions, the polarizing axes of the polarizing planes of said liquid crystal polarizing plates being changed at 90° synchronously with the right and left images and the images which passed through said liquid crystal polarizing plates being observed by said polarizing spectacles.

3. The apparatus according to claim 1, wherein said right and left images are alternately generated every field from said image generating means, and said stereoscopic image display means comprises:

a CRT;

linear polarizing plates which are arranged in front of said CRT and whose polarizing planes have predetermined polarizing axes; and liquid crystal polarizing spectacles in which liquid crystal polarizing plates constructed by liquid crystal plates and linear polarizing plates which are driven synchronously with said right and left images are placed at right and left eye positions, said liquid crystal polarizing spectacles being driven synchronously with said right and left images in a manner such that the polarizing axis of the polarizing plane of one of the liquid crystal polarizing plates coincides with the polarizing axis of said linear polarizing plate and the polarizing axis of the polarizing plane of the other liquid crystal polarizing plate has a difference of 90°, and the images which passed through said linear polarizing plates being observed by said polarizing spectacles.

4. The apparatus according to claim 1, wherein said right and left images are simultaneously generated from said image generating means, and said stereoscopic image display means comprises:
two CRTs to which said right and left images are inputted;
linear polarizing plates which are arranged in front of said CRTs and in which polarizing axes of polarizing planes have a difference of 90°; and
polarizing spectacles such that linear polarizing plates in which polarizing axes of polarizing planes coincide with the polarizing axes of said linear polarizing plates are placed at right and left eye positions, the images which passed through the linear polarizing plates arranged in front of said CRTs being observed by said polarizing spectacles.

5. The apparatus according to claim 2, wherein said CRT comprises three tubes of RGB and the images from said image generating means are inputted to said CRTs as RGB signals.

6. The apparatus according to claim 3, wherein said CRT comprises three tubes of RGB and the images from said image generating means are inputted to said CRTs as RGB signals.

7. The apparatus according to claim 4, wherein each said CRT comprises three tubes of RGB and the images from said image generating means are inputted to said CRTs as RGB signals.

8. The apparatus according to claim 2, wherein said stereoscopic image display means is a projecting type display means having a screen to project the image displayed by said CRT.

9. The apparatus according to claim 3, wherein said stereoscopic image display means is a projecting type display means having a screen to project the image displayed by said CRT.

10. The apparatus according to claim 4, wherein said stereoscopic image display means is a projecting type display means having a screen to project the image displayed by said CRT.

11. The apparatus according to claim 5, wherein said stereoscopic image display means is a projecting type display means having a screen for optically synthesizing the images displayed by said CRTs of RGB and projecting the synthesized image.

12. The apparatus according to claim 6, wherein said stereoscopic image display means is a projecting type display means having a screen for optically synthesizing the images displayed by said CRTs of RGB and projecting the synthesized image.

13. The apparatus according to claim 7, wherein said stereoscopic image display means is a projecting type display means having a screen for optically synthesizing the images displayed by said CRTs of RGB and projecting the synthesized image.

14. The apparatus according to claim 1, wherein said position detecting means comprises:
infrared light emitting means arranged behind said observer; and
infrared photosensitive means, arranged in front of the observer, for receiving infrared rays from said infrared light emitting means according to a position of said observer, and wherein said selecting means selects said image generating means in accordance with light reception outputs from said infrared photosensitive means.

15. The apparatus according to claim 14, wherein said infrared light emitting means comprises a plurality of light emitting devices each of which has a predetermined light emission angle and which are arranged in accordance with moving positions of the observer, said infrared photosensitive means comprises a plurality of photosensitive devices each having a predetermined light reception angle, and detection results of said plurality of photosensitive devices are synthesized, thereby detecting a viewing point position of said observer.

16. The apparatus according to claim 1, wherein said position detecting means comprises:
infrared light emitting means which is attached to said observer; and
infrared photosensitive devices, arranged in front of the observer, for receiving infrared rays from said infrared light emitting means according to a position of said observer, and wherein said selecting means selects said image generating means in accordance with light reception outputs from said infrared photosensitive devices.

17. The apparatus according to claim 1, wherein said image generating means simultaneously generates a plurality of images in accordance with positions in a plurality of different predetermined ranges of the observer and a plurality of images according to one predetermined range position are selected by said selecting means, and said selected plurality of images are supplied to said stereoscopic image display means, and the image according to an observing position among positions of said one predetermined range of the observer among said plurality of images is observed.

18. The apparatus according to claim 17, wherein said stereoscopic image display means includes a lenticular lens.

19. The apparatus according to claim 16, wherein said infrared light emitting means is attached to polarizing spectacles worn by said observer.

20. The apparatus according to claim 15, wherein said infrared light emitting means comprises at least three light emitting devices and said infrared photosensitive means comprises at least three photosensitive devices.

21. A stereoscopic display apparatus for supplying right and left images, comprising:
image generating means for simultaneously generating a plurality of left and right images by a plurality of cameras positioned about an object corresponding to a plurality of viewing point positions of an observer;
position detecting means for detecting a viewing point position of the observer standing within a predetermined area that includes said plurality of viewing point positions to observe the generated images, the position detecting means including:
stationary light emitting means for emitting light through the predetermined area in which the observer may move about among said plurality of viewing point positions to observe the generated images; and
photosensitive means, facing the light emitting means, for receiving light from said light emitting means, wherein a portion of the light is interrupted by the observer standing at a viewing point position within the predetermined area between the light emitting means and the photosensitive means; and switching means for first selecting at least four cameras corresponding to the viewing point position detected by said position detecting means from said image generating means and then simultaneously displaying the four images generated by the selected cameras on a lenticular screen such that the generated images can be viewed by an observer.

22. The apparatus according to claim 14, wherein said infrared light emitting means comprises one light emitting device and said infrared photosensitive means comprises one infrared photosensitive device, and at least one of said infrared light emitting means and said infrared photosensitive means is periodically moved in the approximate direction of a moving position direction of the observer.

23. A stereoscopic display apparatus for supplying right and left images to a stereoscopic image display, the right and left images having a difference between visual angles corresponding to eyes of an observer, comprising:

image generating means for generating a plurality of right and left images by a plurality of cameras positioned about an object corresponding to a plurality of viewing point positions for said stereoscopic image display;

position detecting means for detecting a viewing point position of an observer standing within a predetermined area that includes said plurality of viewing point positions to observe said stereoscopic image display, the position detecting means including:

stationary light emitting means for emitting light through the predetermined area in which the observer may move about among said plurality of viewing point positions to observe said stereoscopic image display; and photosensitive means, facing the light emitting means, for receiving light from said light emitting means, wherein a portion of the light is interrupted by the observer standing at a viewing point position within the predetermined area between the light emitting means and the photosensitive means; and selecting means for first selecting a subset of the plurality of cameras corresponding to the viewing point position detected by said position detecting means and then supplying a right image and left image to said stereoscopic image display.

\* \* \* \* \*